(12) United States Patent
Inamoto (10) Patent No.: US 7,391,577 B2
(45) Date of Patent: Jun. 24, 2008

(54) PROJECTION LENS AND PROJECTOR (75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 98 days.

(21) Appl. No.: 11/528,448

(22) Filed: Sep. 28, 2006

(65) Prior Publication Data
US 2007/0076302 A1 Apr. 5, 2007

(30) Foreign Application Priority Data
Sep. 30, 2005 (JP) ............... 2005-287172

(51) Int. Cl.
*G02B 3/00* (2006.01)
(52) U.S. Cl. ..................... 359/649; 359/651
(58) Field of Classification Search .............. 359/649, 359/651; 264/328.1, 478
See application file for complete search history.

(56) References Cited

U.S. PATENT DOCUMENTS 6,765,732 B2 * 7/2004 Yamamoto et al. .......... 359/811

FOREIGN PATENT DOCUMENTS

JP 2004-361620 A 12/2004

* cited by examiner

*Primary Examiner*—William C Choi
(74) *Attorney, Agent, or Firm*—Birch, Stewart, Kolasch & Birch, LLP (57) ABSTRACT

A projector includes a projection lens having a first lens. The first lens is a plastic lens made by injection molding using a single gate, and has a gate mark on its outer edge. The first lens also has a weld line at the opposite side to the gate mark, which extends from the outer edge. The first lens is positioned such that the gate mark faces a long side of a rectangular pattern of image light on the lens surface, and the weld line becomes disposed outside the rectangular pattern.

10 Claims, 6 Drawing Sheets

PROJECTION LENS AND PROJECTOR

FIELD OF THE INVENTION

The present invention relates generally to a projection lens and a projector having a plastic lens. More particularly, the present invention relates to a projection lens which uses a plastic lens made by injection molding and prevents deterioration of images, and a projector using such projection lens.

BACKGROUND OF THE INVENTION

There is a type of projectors which uses an image display device to modulate illumination light from a light source into image light, which is then magnified and projected on a screen through a projection lens. Since the projectors are getting smaller and smaller, the projection lens of the projectors is usually a difficult-to-manufacture aspherical lens so that the projection lens can fit into a small housing of the projectors.

In view of the manufacturability and the cost, the aspheric lenses are often made of plastic. Such plastic lenses are typically manufactured by injection molding, where molten plastic is injected into a mold. While the injection molding requires the use of a gate through which the molten plastic is injected, it is around the gate that the stream of the molten plastic changes drastically. As a result, the finished plastic lenses sometimes have defects, such as bubbles and striae, in the vicinity of a cut off mark of the gate (gate mark). When these defective plastic lenses are used as the projection lens, the bubbles and the striae may deteriorate the image quality.

As a countermeasure to this drawback, Japanese patent laid-open publication No. 2004-361620 discloses to locate the gate mark of the plastic lens outside an optical usage area. Here, the optical usage area means the area on the lens surface that the image light passes through.

Fortunately, resent improvements on the injection molding technique leads to reduce most of the above mentioned optical defects around the gate mark. On the other hand, however, it becomes recognized that the optical defect called a weld line is formed on the opposite side to the gate mark and impairs the optical performance of the plastic lens. It is also recognized that the weld line may extend to near the central portion of the lens. This symptom is especially prominent in a large diameter concave meniscus lens having the thicker peripheral portion than the central portion, such as the projection lens of the projector.

The weld line is a linear mark formed by the meeting of two streams of the molten plastic which is once separated after the injection through the gate in the mold. When making the concave meniscus lens having the lens thickness ratio of more than 2:1 as described above, the molten plastic firstly separates into two streams to proceed along the lens peripheral portion having low flow resistance, then meets at the opposite side to the gate, and flows into the lens central portion. Accordingly, in many cases, the weld line extends from the lens peripheral portion to the vicinity of the lens central portion. Technically, the weld lines can be reduces by controlling the molding conditions such as the selection of the plastic material, the plastic melt temperature, the mold temperature, the injection rate and so forth. It is, however, difficult to eliminate the weld lines completely while maintaining a certain level of optical performance and preventing the optical defects around the gate mark.

SUMMARY OF THE INVENTION

In view of the foregoing, an object of the present invention is to provide a projection lens never to disrupt the projection of image light even if it uses a lens having weld lines, and to provide a projector using this projection lens.

In order to achieve the above and other objects, the projection lens according to the present invention includes a circular plastic lens having a gate mark of injection molding formed at a spot on a lens outer edge, and a weld line extending toward a lens central portion from the opposite side to the gate mark on the lens outer edge. This plastic lens is positioned in the projection lens such that the gate mark faces a long side of a rectangular pattern of image light on a lens surface. When the projection lens is used as an off axis optical system, the plastic lens is preferably positioned such that the center of the rectangular pattern comes close to the gate mark on the lens surface.

In another embodiment of the present invention, the projection lens includes a circular plastic lens having the gate marks facing to each other on the lens outer edge across an optical axis of the lens, and the weld lines facing to each other across the optical axis of the lens while extending to the lens central portion from the lens outer edge. This plastic lens is positioned in the projection lens such that the gate marks respectively face each of short sides of the rectangular pattern of image light on the lens surface.

In still another embodiment of the present invention, the plastic lens is rotatable around the optical axis, and this rotation is regulated to the degree that the weld line does not enter the rectangular pattern on the lens surface.

The projector according to the present invention has a projection lens for projecting image light in a rectangular pattern onto a screen. The projection lens includes a circular plastic lens having a gate mark of injection molding formed at a spot on a lens outer edge, and a weld line extending toward a lens central portion from the opposite side to the gate mark on the lens outer edge. This plastic lens is positioned in the projection lens such that the gate mark faces a long side of a rectangular pattern of image light on a lens surface.

In another embodiment of the present invention, the projection lens of the projector includes a circular plastic lens having the gate marks facing to each other on the lens outer edge across an optical axis of the lens, and the weld lines facing to each other across the optical axis of the lens while extending to the lens central portion from the lens outer edge. This plastic lens is positioned in the projection lens such that the gate marks respectively face each of short sides of the rectangular pattern of image light on the lens surface.

According to the projection lens of the present invention, the plastic lens is positioned such that the leading end of weld line faces the long side of the rectangular pattern of image light on the lens surface. Since the weld line becomes disposed outside the rectangular pattern, quality degradation of the projected images is prevented. Additionally, when the projection lens is used as the off axis optical system, the plastic lens is positioned such that the rectangular pattern comes close to the gate mark. The weld line in this configuration becomes disposed farther away from the rectangular pattern, and the quality degradation of the projected images is therefore prevented. If the projection lens is configured to rotate the plastic lens, the rotation is regulated to the degree that the weld line does not enter into the rectangular pattern. Therefore, the quality of the projected images is not degraded either.

The projection lens of the present invention may especially be effective for the projectors. Since the rectangular pattern of image light in the projectors generally has a large aspect ratio (16:9, for example) and a large space is remained unused on the projection lens surface accordingly, the weld lines can be disposed outside the rectangular pattern easily. Furthermore, the projection lens of the present invention may especially be effective for the rear projection projectors. Since the projection lens is placed inside the rear projection projectors, the weld line on the plastic lens never spoil the appearance of the projectors.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
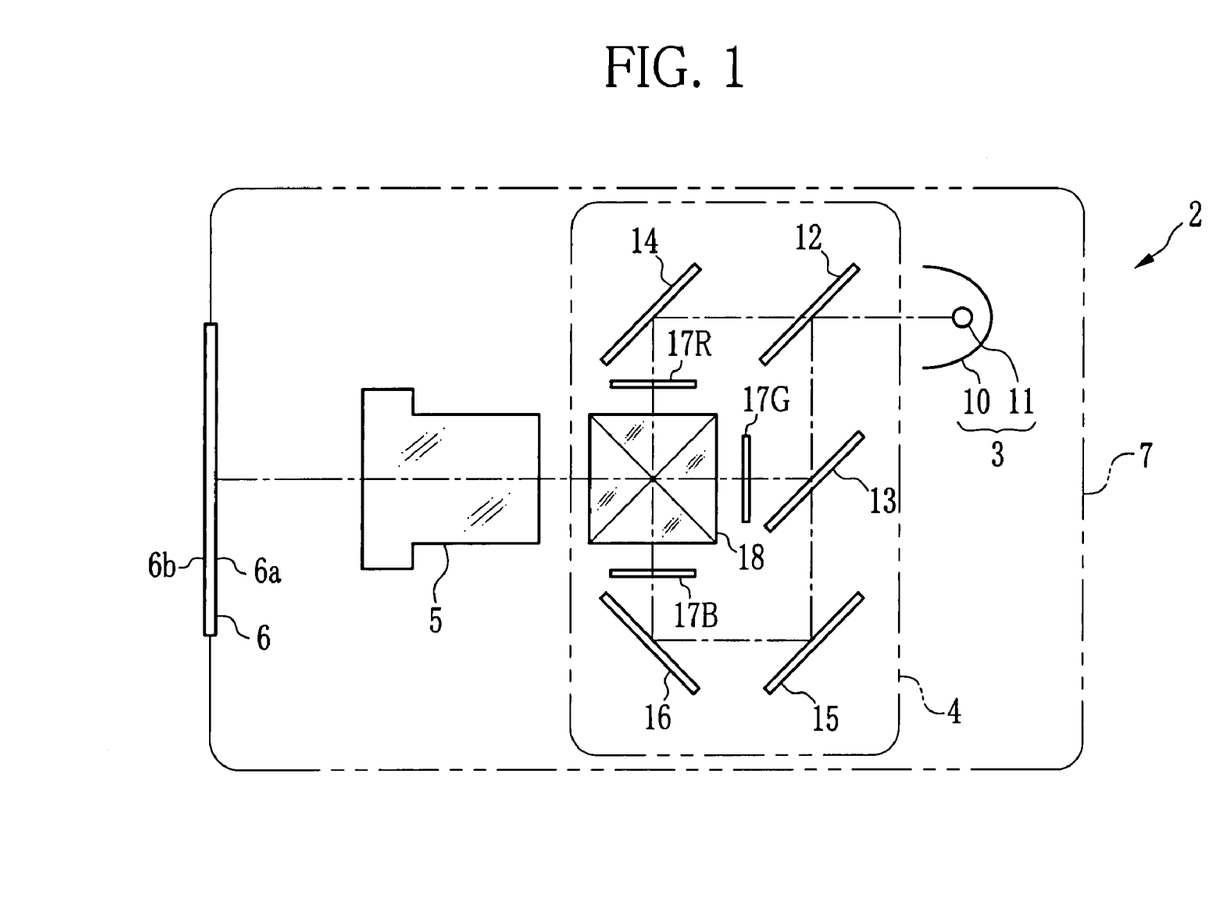
FIG. 1 is a schematic view of a configuration of a rear projection projector.

Referring to FIG. 1, a projector 2 includes a light source section 3, an image forming section 4, a projection lens 5, and a screen 6. The projector 2 is of a rear projection type where image light is projected on a rear surface 6a of the screen 6 and the images are viewed on a front surface 6b of the transmissive screen 6. The numeral 7 denotes a projector housing.

The light source section 3 is composed of a light source 10 and a reflector 11. The light source 3 emits white illumination light, which is then reflected by the reflector 11 and enters a dichroic mirror 12.

The image forming section 4 is composed of the dichroic mirrors 12, 13, reflecting mirrors 14, 15, 16, liquid crystal panels 17R, 17G, 17B, and a dichroic prism 18. The dichroic mirror 12 transmits red light while reflects green light and blue light. The dichroic mirror 13 transmits the blue light while reflects the green light. The red light contained in the white light from the light source 10 passes through the dichroic mirror 12 and reflects off the reflecting mirror 14 to enter the liquid crystal panel 17R. The green light contained in the white light is reflected firstly by the dichroic mirror 12 and subsequently by the dichroic mirror 13 to enter the liquid crystal panel 17G. The blue light contained in the white light is reflected by the dichroic mirror 12, and passes through the dichroic mirror 13, then reflects off the reflecting mirrors 15, 16 to enter the liquid crystal panel 17B.

The liquid crystal panels 17R, 17G, 17B change transmittance of the light on each pixel in combination with polarizers. During the passage through the corresponding liquid crystal panel, the red, green, and blue light is modulated into image light of its own color and then enter the dichroic prism 18. The dichroic prism 18 synthesizes these image light, and the synthesized color image light enters the projection lens 5. The color image light is magnified and projected by the projection lens 5 onto the rear surface 6a of the screen 6. The users view the projected color images on the front surface 6b of the screen 6.

Figure 2:
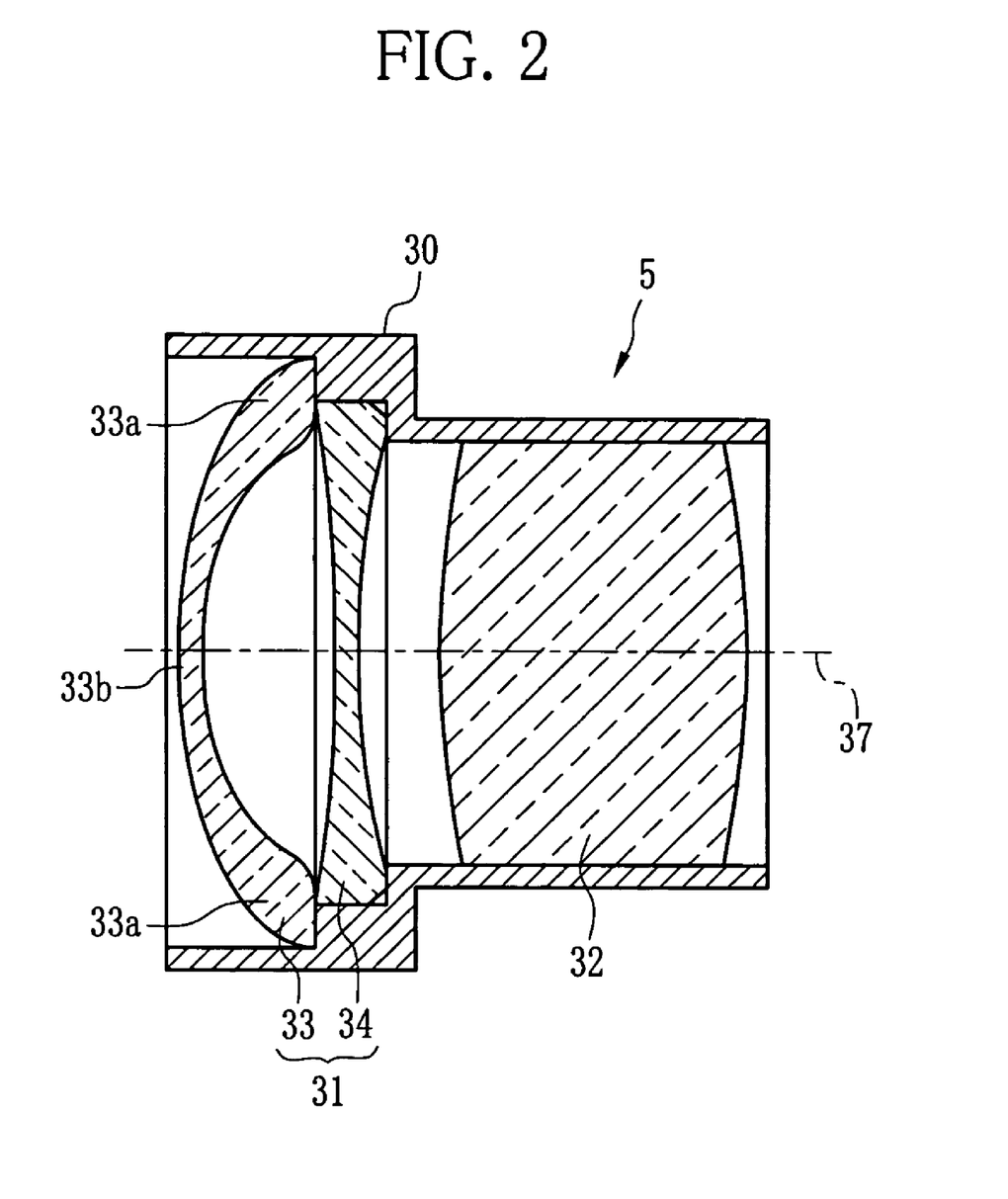
FIG. 2 is a schematic cross sectional view of a projection lens according to the present invention.

As shown in FIG. 2, the projection lens 5 has a lens barrel 30 which holds a front lens group 31 composed of a first lens 33 and a second lens 34, and a rear lens group 32 composed of a plurality of glass lenses. The first lens 33 is a plastic-made, concave menisucus lens whose surfaces are both aspherical. The first lens 33 has a peripheral portion defined as a thick portion 33a and a central portion defined as a thin portion 33b. The thick portion 33a is approximately three times as thick as the thin portion 33b. The second lens 34 is a double concave lens. In this embodiment, the projection lens 5 is fixed focus.

Figure 3:
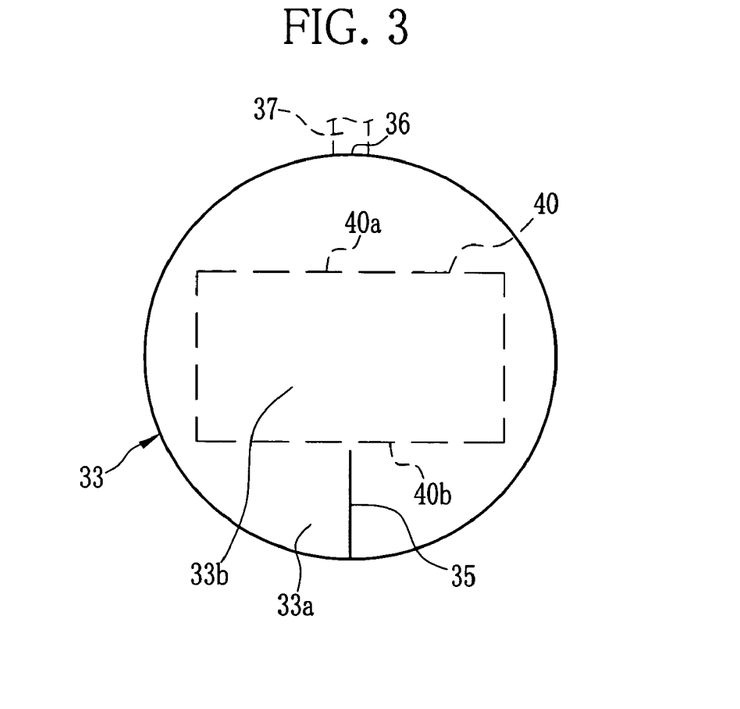
FIG. 3 is an explanatory view showing the positions of a rectangular pattern and a weld line on a plastic lens made using a single gate.

The first lens 33 is made by injection molding, where molten plastic is injected into a mold. As illustrated in FIG. 3, the molten plastic is injected through a gate 37. Since the gate 37 is cut off from the first lens 33 when the injection molding completes, the cut off mark of the gate 37 is left as a gate mark 36 on the first lens 33.

In FIG. 3, the first lens 33 has a weld line 35. The weld line 35 is a linear mark formed when two separate stream of the molten plastic meet in the mold after the injection through the gate 37. With the shape of the first lens 33, the molten plastic firstly separates into two streams at the thick portion 33a having low flow resistance, then meets at the opposite side to the gate and flows into the thin portion 33b. Accordingly, the weld line 35 is formed on the opposite side to the gate mark 36 and extends toward the lens central portion from the lens outer edge.

The projection lens 5 is fixed in a predetermined location and orientation inside the projector housing 7. Through this projection lens 5, the image light from the image forming section 4 is projected in a rectangular pattern onto the screen 6. On the surface of the first lens 33, a rectangular pattern 40 of the image light has an aspect ratio of 16:9, and the center of the rectangular pattern 40 coincides approximately with the center of the first lens 33. In this embodiment, the first lens 33 is positioned such that the gate mark 36 faces a long side 40a of the rectangular pattern 40. Thereby, the weld line 35 that faces the gate mark 36 becomes disposed outside the rectangular pattern 40 beyond a long side 40b. Since a large unused area stretches outside the long side 40b, the weld line 35 does not enter into the rectangular pattern 40. It should be understood that the rectangular pattern 40 is not limited to the above aspect ratio.

The projection lens 5 may be configured to allow fine focus adjustment after the installation in the projector 2. There are several methods of the fine focus adjustment, the most common method is to use a helicoid screw which rotates with the front lens group 31 to move it in the optical axis direction. Certainly, the rotation of the front lens group 31 at the fine focus adjustment causes to move the weld line 35. It is therefore preferable to design a lead of the helicoid screw to regulate the rotation to the degree that the weld line 35 does not enter into the rectangular pattern 40.

Although it is desirable that the weld line 35 is oriented almost perpendicular to the long side 40b of the rectangular pattern 40, the weld line 35 can be oriented oblique to the long side 40b as long as it does not enter into the rectangular pattern 40.

The image light from the image forming section 4 passes through the rear lens group 32, the second lens 34, and the first lens 33 to be magnified and projected on the screen 6. Since the weld line 35 is disposed outside the rectangular pattern 40 on the first lens 33 of the projection lens 5 according to the present invention, the image quality is not impaired by the weld line 35. Additionally, the weld line 35 does not enter into the rectangular pattern 40 even after the fine focus adjustment, and therefore the image quality is not impaired either in this case. Still advantageously, the projection lens 5 is installed inside the projector housing 7, and the weld line 35 on the plastic lens never spoils the appearance of the projector.

Figure 4:
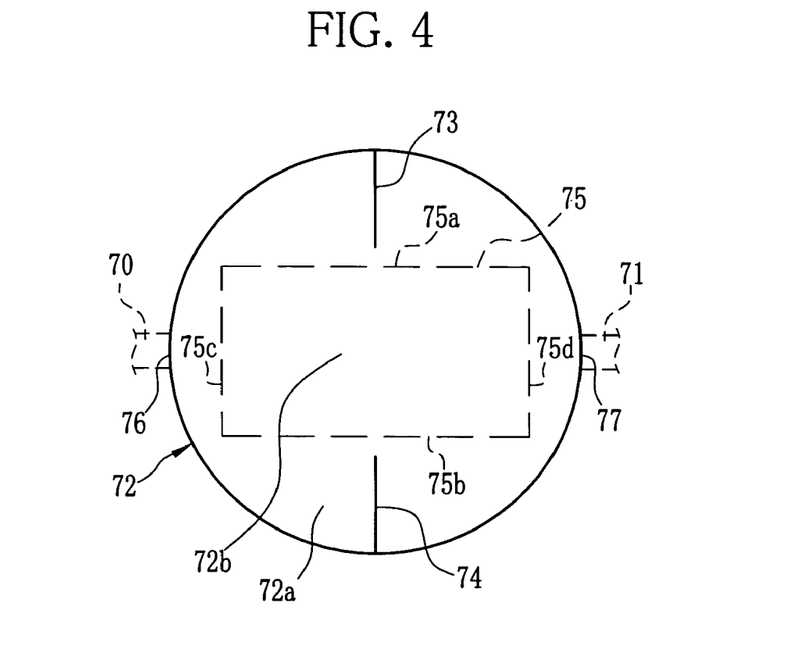
FIG. 4 is an explanatory view showing the positions of the rectangular pattern and the weld lines on a plastic lens made using a couple of gates.

In the above embodiment, the first lens is formed by the injection molding using a single gate. However, as shown in FIG. 4, the injection molding may be performed with a couple of gates 70, 71 facing each other to form a first lens 72. The first lens 72 is identical in shape to the first lens 33, composed of the peripheral portion defined as a thick portion 72a and the central portion defined as a thin portion 72b. The first lens 72 has two weld lines 73, 74 formed between gate marks 76, 77 and extending from the lens outer edge toward the lens central portion. The weld lines 73, 74 faces each other across an optical axis of the lens. In this embodiment, the first lens 72 is positioned such that the gate marks 76, 77 face short sides 75c, 75d of a rectangular pattern 75 respectively. Thereby, the weld line 73 becomes disposed outside a long side 75a and, in addition, the weld line 74 becomes disposed outside a long side 75b. Since the weld lines 73, 74 do not enter into the rectangular pattern 75, the quality of the projected images is not impaired.

Although the above embodiments are described with the rear projection projector, the projection lens of the present invention is applicable to front projection projectors. It is to be noted that the following embodiment uses the same numerals to the same components as in the above embodiments, and detailed explanation for such components is omitted.

Figure 5:
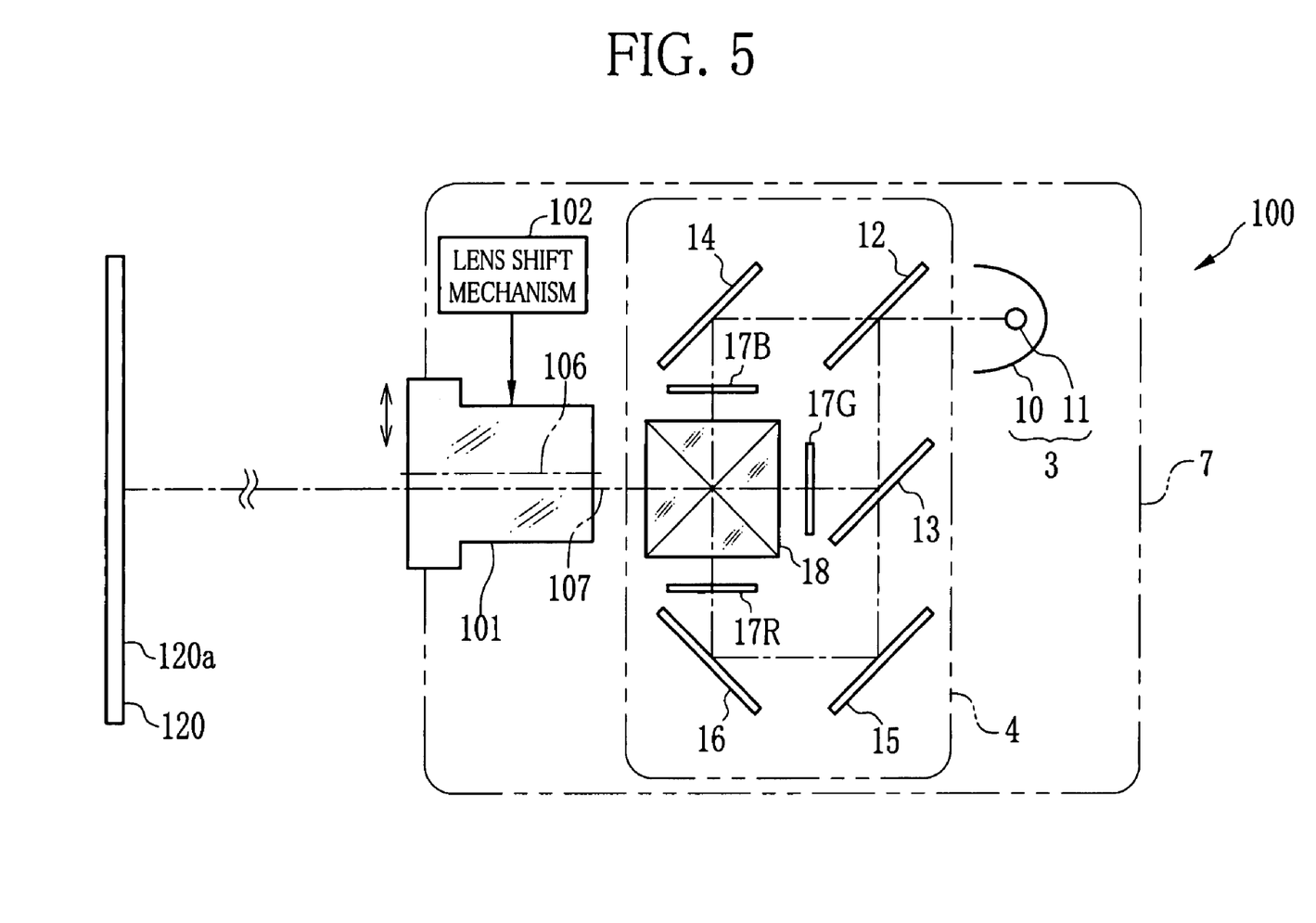
FIG. 5 is a schematic view of a configuration of a front projection projector.

As shown in FIG. 5, a projector 100 includes the light source section 3, the image forming section 4, a projection lens 101, and a lens shift mechanism 102. The projector 100 is of front projection type where image light is projected onto a projection surface 120a of a screen 120, and the images are viewed from the same side as the projection. The light source 3 emits white illumination light, which is modulated into three color image light by the image forming section 4 and then enters the projection lens 101.

Figure 6:
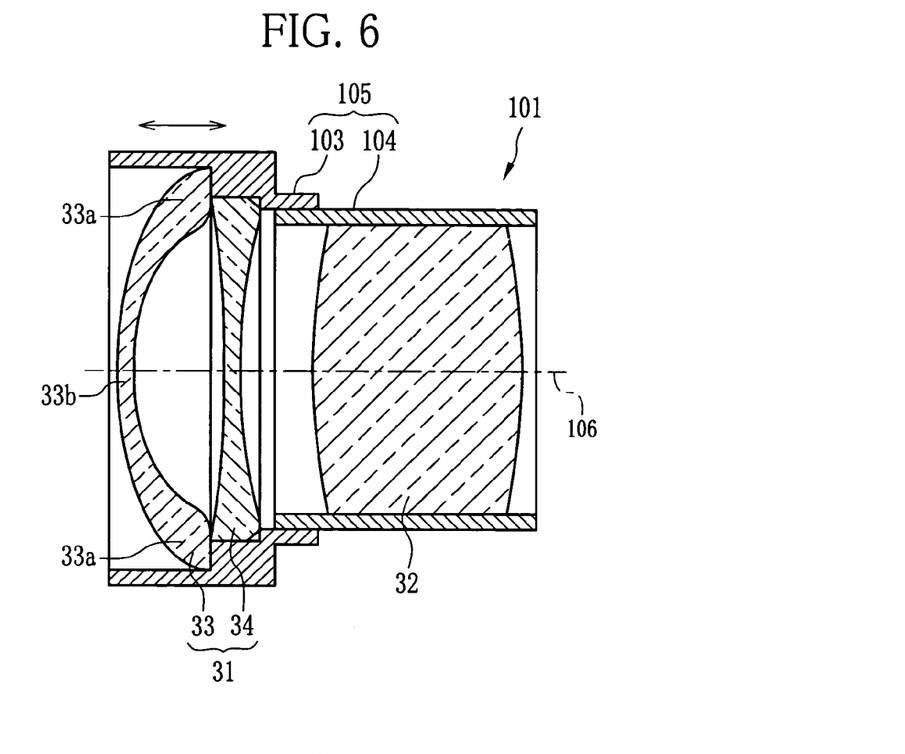
FIG. 6 is a schematic cross sectional view of a projection lens according to another embodiment of the present invention.

As shown in FIG. 6, the projection lens 101 has a lens barrel 105 constituted of a movable barrel 103 and a fixed barrel 104. The movable barrel 103 holds the front lens group 31 composed of the first lens 33 and the second lens 34, and the fixed barrel 104 holds the rear lens group 32 composed of a plurality of the glass lenses. When rotated relative to the fixed barrel 104, the movable barrel 103 moves in the optical axis direction. This rotation will change magnification and a focal point. The rotation of the movable barrel 103 is regulated to a predetermined degree.

The projection lens 101 is fixed in an initial, or default, location and orientation inside the projector housing 7. In this state, an optical axis 106 of the projection lens 101 coincides with a reference center line 107 (see, FIG. 5). Here, the reference center line 107 runs through the center of an optical path of the image light which goes from the image forming section 4 to the projection lens 101.

In FIG. 5, the lens shift mechanism 102 shifts the projection lens 101 upwards with respect to the reference center line 107. Even during the shift, the optical axis 106 of the projection lens 101 is always maintained parallel to the reference center line 107. When the projection lens 101 is shifted upwards, the image light firstly passes through the lower part of the rear lens group 32 (see, FIG. 6). Subsequently, the image light passes through the second lens 34 and the upper part of the first lens 33, and is then projected on the screen 120. In other words, the upward shift of the projection lens 101 leads the projected images to move upwards on the screen 120.

Figure 7:
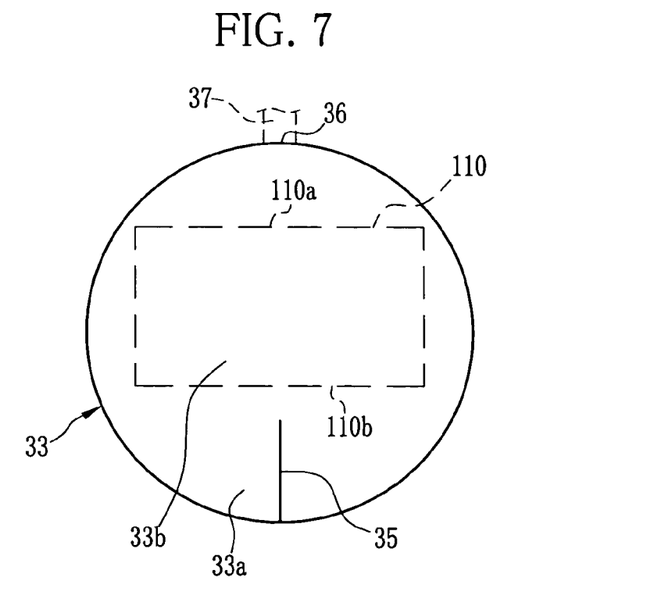
FIG. 7 is an explanatory view showing the position of the rectangular pattern on a first lens of the projection lens which is shifted.

In operation, the projection lens 101 is normally shifted upwards with respect to the reference center line 107. Accordingly, as shown in FIG. 7, a rectangular pattern 110 of the image light is not centered at the center of the lens surface of the first lens 33 but shifted upwards (toward the gate mark 36). In this embodiment, the first lens 33 is positioned such that the gate mark 36 faces a long side 110a of the rectangular pattern 110. Thereby, the weld line 35 becomes disposed outside the rectangular pattern 110. It should be understood that the rectangular pattern 110 has the aspect ratio of 16:9 and that the present invention is not limited to this aspect ratio.

Figure 8A:
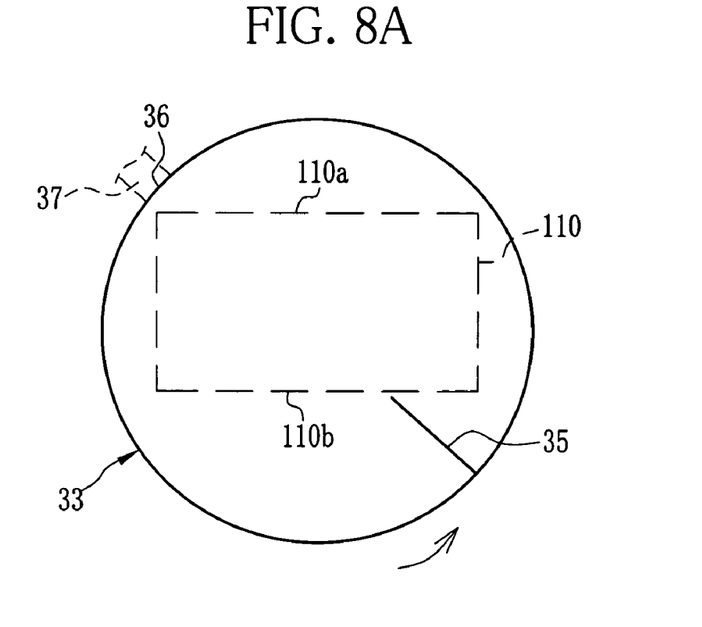
FIGS. 8A and 8B are explanatory views showing a rotation degree of the plastic lens.
Figure 8B:
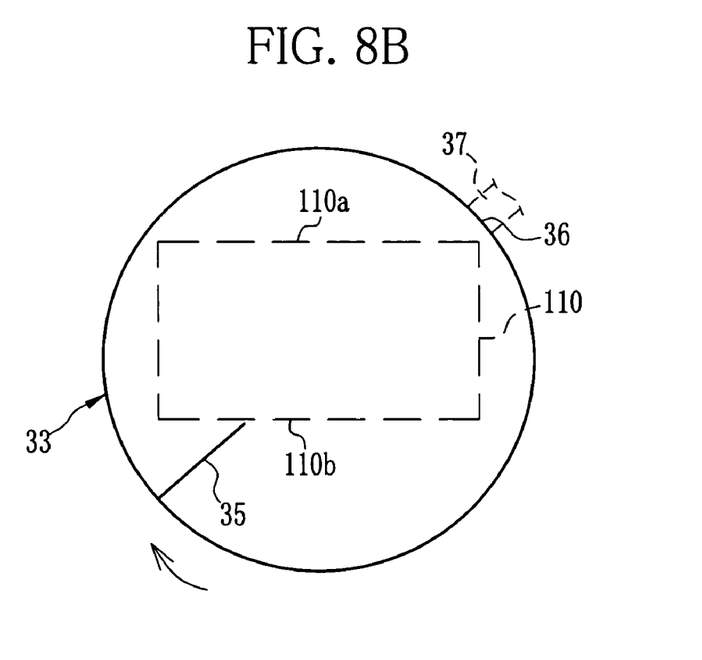

As mentioned above, the movable barrel 103 of the projection lens 101 is rotatable relative to the fixed barrel 104, and the first lens 33 will rotate between, for example, the position of FIG. 8A (the maximum rotation angle in the counterclockwise direction) and the position of FIG. 8B (the maximum rotation angle in the clockwise direction). At the position of FIG. 8A, one end of the long side 110a of the rectangular pattern 110 does not go past the gate mark 36, and the leading end of the weld line 35 comes closest to a long side 110b but never entering into the rectangular pattern 110. At the position of FIG. 8B, the other end of the long side 110a of the rectangular pattern 110 does not go past the gate mark 36, and the leading end of the weld line 35 comes closest to a long side 110b but never entering into the rectangular pattern 110.

In the projection lens 101, the weld line 35 of the first lens 33 does not enter into the rectangular pattern 110, and therefore the quality of the projected images is not impaired by the weld line 35.

Although the plastic lens of the projection lens is the concave meniscus lens in the above embodiments, the shape of the plastic lens is not limited to this. In addition, the thickness ratio between the thick portion and the thin portion of the plastic lens is not limited to the above embodiments.

Various changes and modifications are possible in the present invention and may be understood to be within the present invention.

What is claimed is:

1. A projection lens for projecting image light in a rectangular pattern onto a screen, comprising:
   a circular plastic lens which has a gate mark of injection molding formed at a spot on a lens outer edge and a weld line extending toward a lens central portion from an opposite side to said gate mark on said lens outer edge, said plastic lens being positioned such that said gate mark faces a long side of said rectangular pattern of said image light on a lens surface.

2. A projection lens described in claim 1, wherein said plastic lens is positioned such that a center of said rectangular pattern comes close to said gate mark on said lens surface.

3. A projection lens described in claim 1, wherein said plastic lens is rotatable around an optical axis, and wherein said rotation is regulated to the degree that said weld line does not enter into said rectangular pattern on said lens surface.

4. A projection lens for projecting image light in a rectangular pattern onto a screen, comprising:
   a circular plastic lens which has gate marks of injection molding formed at two spots approximately 180 degrees apart from each other on a lens outer edge and two weld lines facing each other across an optical axis while extending toward a lens central portion from said lens outer edge, said plastic lens being positioned such that said gate marks respectively face each of short sides of said rectangular pattern of said image light on a lens surface.

5. A projection lens described in claim 4, wherein said plastic lens is rotatable around said optical axis, and wherein said rotation is regulated to the degree that said weld lines do not enter into said rectangular pattern on said lens surface.

6. A projector having a projection lens for projecting image light in a rectangular pattern onto a screen, said projection lens comprising:

a circular plastic lens which has a gate mark of injection molding formed at a spot on a lens outer edge and a weld line extending toward a lens central portion from an opposite side to said gate mark on said lens outer edge, said plastic lens being positioned such that said gate mark faces a long side of said rectangular pattern of said image light on a lens surface.

7. A projector described in claim 6, wherein said plastic lens is positioned such that a center of said rectangular pattern comes close to said gate mark on said lens surface.

8. A projector described in claim 6, wherein said plastic lens is rotatable around an optical axis, and wherein said rotation is regulated to the degree that said weld line does not enter into said rectangular pattern on said lens surface.

9. A projector having a projection lens for projecting image light in a rectangular pattern onto a screen, said projection lens comprising:

a circular plastic lens which has gate marks of injection molding formed at two spots approximately 180 degrees apart from each other on a lens outer edge and two weld lines facing each other across an optical axis while extending toward a lens central portion from said lens outer edge, said plastic lens being positioned such that said gate marks respectively face each of short sides of said rectangular pattern of said image light on a lens surface.

10. A projector described in claim 9, wherein said plastic lens is rotatable around said optical axis, and wherein said rotation is regulated to the degree that said weld lines do not enter into said rectangular pattern on said lens surface.

* * * * *